United States Patent Office.

EUGENIUS A. HILDRETH, OF WHEELING, WEST VIRGINIA.

*Letters Patent No. 74,225, dated February 11, 1868.*

IMPROVED COMPOSITION OF MATTER FOR FORMING ORNAMENTS, &c.

*The Schedule referred to in these Letters Patent and making part of the same.*

TO ALL WHOM IT MAY CONCERN:

Be it known that I, EUGENIUS A. HILDRETH, of Wheeling, in the county of Ohio, and State of West Virginia, have invented a new and useful Composition of Matter for Ornamenting Wood-Work, Ornaments in Architecture, and other useful purposes; and I do hereby declare that the following is a full, clear, and exact description thereof.

I mix intimately clean, dry saw-dust, woody fibre, or pulverized wood, with or without carbonates of magnesia, lime, baryte, iron, lead, zinc, or copper, or caustic lime, or an equivalent salt, to which I add solution of silicate of soda, or potassa of specific gravity 1.5 to 1.8, 60° Fahrenheit, in quantity sufficient to form a plastic mass when worked intimately together, so that it can be pressed into forms or moulds. When dry it becomes hard; but I prefer to immerse or saturate the material after moulding in one of the following solutions or mixtures of them, whilst they are hot or cold, viz, strong solution (near the point of crystallization) of chloride of magnesium, chloride barium, chloride calcium, chloride ammonium, chloride zinc, chloride iron, chloride lead, chloride copper, or equivalent decomposing-salt. The material before immersion, as described, being soft and plastic, becomes, after immersion, hardened or petrified, and durable. The proportion of first-mentioned salts is variable—usually ten parts of saw-dust to one of the salt.

What I claim as my invention, and desire to secure by Letters Patent, is—

1. The method herein described of moulding saw-dust or pulverized wood into shapes and forms that will become hard and strong, that is to say, by mixing the said saw-dust or pulverized wood with a solution of silicate of soda or potassa into a plastic mass, and then moulding the same, substantially as described.

2. I also claim the method of immersing or saturating objects moulded from saw-dust or pulverized wood, and silicate of soda or potassa, as above described, in a solution of the chloride of magnesium, barium, calcium, ammonium, zinc, iron, lead, or copper, or equivalent decomposing-salt, while in a soft or plastic state, substantially as and for the purpose set forth.

3. I also claim, as a new article of manufacture, architectural ornaments, and other similar hard substances, composed of saw-dust or pulverized wood, cemented together by silicates, and moulded into forms, substantially as herein described.

EUGENIUS A. HILDRETH.

Witnesses:
   A. J. BOWMAN,
   DANL. PECK.